United States Patent
Nelapatla et al.

(10) Patent No.: US 12,510,592 B1
(45) Date of Patent: Dec. 30, 2025

(54) DYNAMICALLY CONFIGURABLE SYSTEM-ON-CHIP NETWORK

(71) Applicant: Synopsys, Inc., Sunnyvale, CA (US)

(72) Inventors: Bala Tarun Nelapatla, San Jose, CA (US); Abhijeet Prakash Samudra, Santa Clara, CA (US); Salvatore Talluto, Gavirate (IT); Venkata Raja Ramchandar Koneru, Georgetown, TX (US)

(73) Assignee: Synopsys, Inc., Sunnyvale, CA (US)

( * ) Notice: Subject to any disclaimer, the term of this patent is extended or adjusted under 35 U.S.C. 154(b) by 74 days.

(21) Appl. No.: 18/540,780

(22) Filed: Dec. 14, 2023

(51) Int. Cl.
*G01R 31/317* (2006.01)
*G01R 31/319* (2006.01)

(52) U.S. Cl.
CPC . *G01R 31/31704* (2013.01); *G01R 31/31724* (2013.01); *G01R 31/31908* (2013.01)

(58) Field of Classification Search
None
See application file for complete search history.

(56) References Cited

U.S. PATENT DOCUMENTS

| | | | |
|---|---|---|---|
| 10,996,271 B1 * | 5/2021 | Weinraub | G01R 31/2851 |
| 11,379,644 B1 * | 7/2022 | Khurana | G06Q 50/184 |
| 2017/0205462 A1 * | 7/2017 | Mukherjee | G01R 31/3187 |
| 2019/0128963 A1 * | 5/2019 | Wu | G01R 31/318558 |

FOREIGN PATENT DOCUMENTS

WO WO-2020222198 A1 * 11/2020 ............. H04L 45/74

* cited by examiner

*Primary Examiner* — Guerrier Merant (57) ABSTRACT

A device includes a processing device, a set of local resources coupled to the processing device, a plurality of parent interfaces, and a plurality of child interfaces. Each parent interface and each child interface is configured to couple the processing device to a respective node residing outside of the device when selected. The processing device is to select one parent interface, such that a selection of the one parent interface causes the respective node coupled to the one parent interface to operate as a parent of the processing device. The processing device is to further select one child interface, such that a selection of the one child interface causes the processing device to operate as a parent of the respective node coupled to the one child interface.

19 Claims, 5 Drawing Sheets

DYNAMICALLY CONFIGURABLE SYSTEM-ON-CHIP NETWORK

TECHNICAL FIELD

The present disclosure relates generally to integrated circuits and relates more particularly to a dynamically configurable system-on-chip network.

BACKGROUND

A system-on-chip (SoC) is a type of integrated circuit that integrates most or all components of a computer or other electronic systems. In most SoCs, a serial network is used in a design for testability context to provide control data to program control registers (e.g., test data registers (TDRs), IEEE 1687 segment insertion bits (SIBs), or other registers). These serial networks may utilize a parent-child architecture, where the parent node includes a top-level interface or external control (e.g., a test access port (TAP)), and the child nodes include TDR registers, SIBs, and related enablers. The nodes are daisy-chained in a parent-child configuration in which each parent node has one or more child nodes, and each child node has exactly one parent node.

SUMMARY

A device includes a processing device, a set of local resources coupled to the processing device, a plurality of parent interfaces, and a plurality of child interfaces. Each parent interface is configured to couple the processing device to a respective node residing outside of the device when selected, while each child interface is configured to couple the processing device to a respective node residing on outside of the device when selected. The processing device is to select one parent interface, such that a selection of the one parent interface causes the respective node coupled to the one parent interface to operate as a parent of the processing device. The processing device is to further select one child interface, such that a selection of the one child interface causes the processing device to operate as a parent of the respective node coupled to the one child interface.

A system-on-chip includes a source to drive a network on the system-on-chip and a plurality of tiles. Each tile of the plurality of tiles includes a processing device, a set of local resources coupled to the processing device, a plurality of parent interfaces, and a plurality of child interfaces. At least some parent interfaces are to connect the processing device to a respective node residing outside of the processing device, while at least some child interfaces are to connect the processing device to a respective node residing outside of the device. The processing device is to select one parent interface of the at least some parent interfaces, such that a selection of the one parent interface causes the respective node coupled to the one parent interface to operate as a parent of the processing device. The processing device is to further select one child interface of the at least some child interfaces, such that a selection of the one child interface causes the processing device to operate as a parent of the respective node coupled to the one child interface. The source is coupled to the processing device of a first tile of the plurality of tiles via a first parent interface of the plurality of parent interfaces of the first tile.

A method includes monitoring a plurality of parent interfaces of a tile of a system-on-chip for a signal identifying a parent node and configuring, in response to determining that the signal identifying the parent node has been received, a source of the signal as the parent node.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a dynamically configurable system-on-chip network. As discussed above, in most SoCs, a serial network is used in a design for testability context to provide control data to program control registers (e.g., TDR registers, IEEE 1687 SIBs, or other registers). These serial networks may utilize a parent-child architecture, where the parent node includes a top-level interface or external control (e.g., a TAP), and the child nodes include TDR registers, SIBs, and related enablers. The nodes are daisy-chained in a parent-child configuration in which each parent node has one or more child nodes, and each child node has exactly one parent node.

Most networks in the context of design for testability rely on a hardcoded physical path from one node to the next node (thereby establishing the parent-child relationship), and/or on unique identification tags associated with each node, in order to ensure that each node communicates with the correct other nodes. Effectively, this arrangement permits each node to receive data from a single parent node (which may not be the same parent node from which another node receives data).

As discussed above, however, this configuration is hardcoded. That is, once the configuration is physically implemented on an SoC, the serial connections between the nodes cannot be changed. This limits the flexibility of the SoC and may result in vulnerabilities in many use cases. For instance, a tile of the SoC (e.g., a partition containing a node and local resources) may fail for one or more of a number of reasons, including power limitations, defects, binning/floorsweeping, late SoC floorplan changes (with no time for respins and/or engineering change orders), access issues in abutted design styles, physically identical tiles being physically located in different locations, or reuse of the tile in different projects (which may require significant re-placement and routing). A failure at even one tile will break the serial path, thereby rendering all tiles that follow the failed tile in the path (and, consequently, all nodes and physical resources contained in those tiles) inaccessible unless or until the failed tile is repaired. These limitations could also affect network configurations other than serial configurations (e.g., tree configurations).

Examples of the present disclosure provide a dynamically configurable system-on-chip network in which the nodes of the network are self-programmable and configured with multiple parent interfaces. This allows each node in the network to select one of a number of candidate nodes as a parent node by monitoring the multiple parent interfaces for a signal that identifies the parent node (as indicated in a path sequence defined by an external source). Once a node has selected its parent node, the node may then send a signal to the next node in the path sequence (i.e., the node's child node), which is similarly monitoring multiple parent interfaces for the signal. This process continues until the nodes of the network have configured themselves in the manner indicated in the path sequence.

Technical advantages of the present disclosure include, but are not limited to, the ability to reconfigure an existing serial path for a new external source of an SoC network, even post-physical silicon implementation. By providing the nodes of the SoC network with multiple parent interfaces and the ability to support one of multiple potential child nodes, each node can be configured (or re-configured) to select any neighboring node as a parent node, and any neighboring node (excluding the parent node) as a child node. An SoC network configured in this manner may support any layout, including abutted design styles, with little to no change within the SoC tiles.

Further advantages of the present disclosure include improving the functionality of a processor by providing flexibility and resiliency to failure. For instance, if a portion of an SoC network should fail, the ability to reconfigure the SoC network to bypass the failed components may limit processor downtime.

Moreover, while most design for testability networks (serial or otherwise) rely on a predefined topology, or on predefined ways of identifying network nodes (e.g., addresses, names, or the like), the present disclosure provides a way to communicate without a predefined topology or a predefined way of identifying network nodes being established.

Although examples of the present disclosure may be discussed within the context of serial networks or serial paths on SOCs, it will be appreciated that the approach disclosed herein could be used to provide flexibility, configurability, and improved communication for non-serial networks and configurations as well.

Figure 1A:
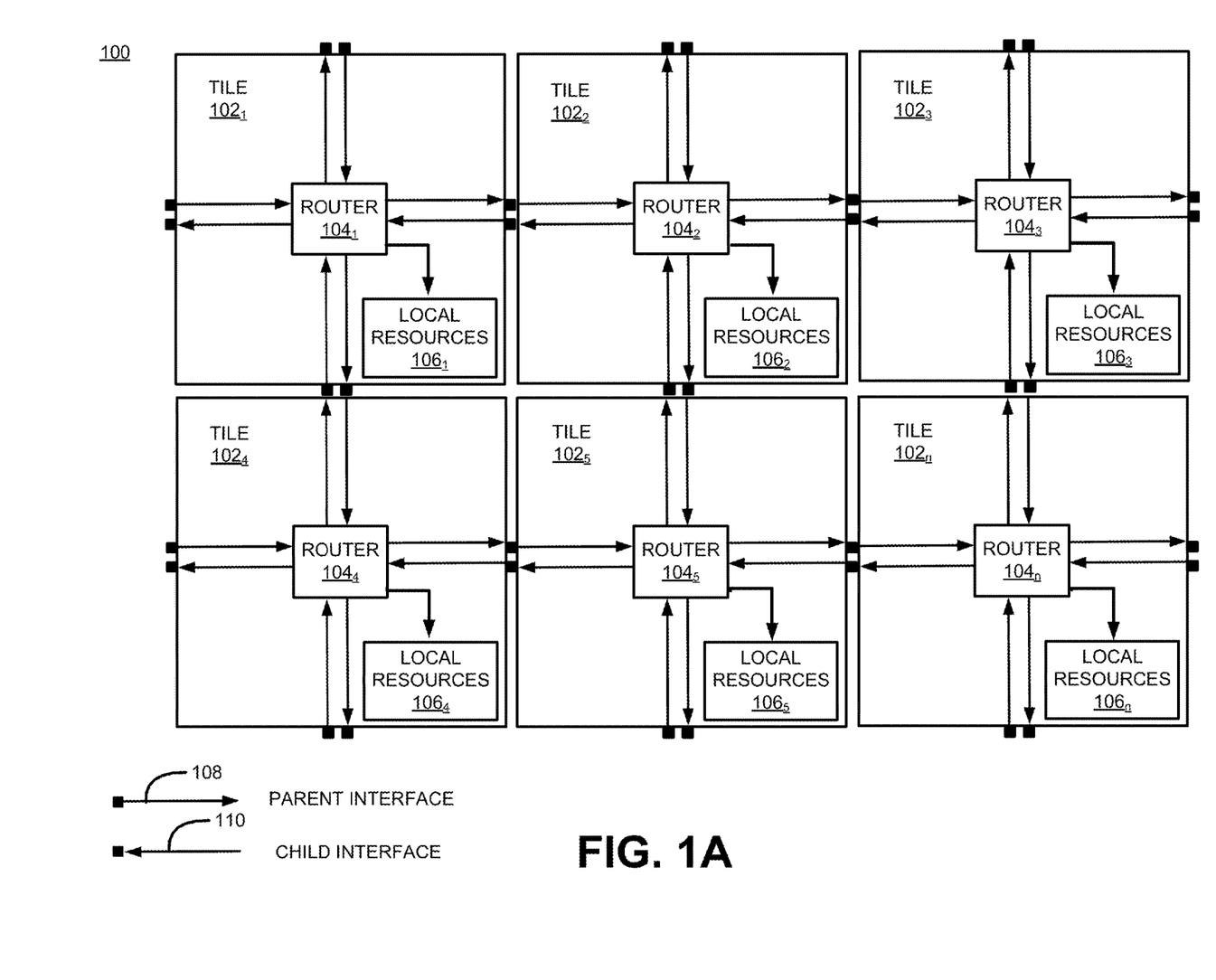
FIG. 1A illustrates a block diagram of a portion of an example system-on-chip that can be dynamically configured as a serial network, according to examples of the present disclosure.

FIG. 1A illustrates a block diagram of a portion of an example system-on-chip (SoC) 100 that can be dynamically configured as a serial network, according to examples of the present disclosure. As illustrated, the SoC 100 may include a plurality of tiles $102_1$-$102_n$ (hereinafter individually referred to as a tile 102 or collectively referred to as tiles 102). In one example, the plurality of tiles 102 may be arranged in a grid pattern (e.g., as a plurality of rows and a plurality of columns). For instance, the tiles 102 in FIG. 1A are arranged in a grid pattern including two rows and three columns. Although six tiles 102 are illustrated in FIG. 1A, it will be appreciated that the SoC 100 may include any number of tiles, including fewer than six tiles and more than six tiles. Additionally, the tiles 102 need not be arranged in a grid pattern, but could be arranged in alternative configurations.

Each tile 102 of the SoC 100 may include a respective router $104_1$-$104_n$ (hereinafter individually referred to as a router 104 or collectively referred to as routers 104) and a respective set of local resources $106_1$-$106_n$ (hereinafter individually referred to as local resources 106 or collectively referred to as local resources 106). Each router 104 may include a TDR register and/or related enabler, such as an IEEE 1687 SIB, and may be considered a node of the serial network. Each set of local resources 106 may include computing resources (e.g., a processing engine or central processing unit (CPU), cache (e.g., Level 1 (L1) and Level 2 (L2) cache), and/or other type of programmable resources usable by the tile 102 (e.g., peripherals, sensors, safety managers, monitors, instruments, or the like) to perform operations in accordance with the serial network.

Each tile may further include a plurality of serial interfaces, including a plurality of parent interfaces and a plurality of child interfaces. For ease of illustration, a single parent interface 108 and a single child interface 110 are labeled in the legend. Each parent interface 108 may be configured to convey or couple signals (e.g., data and/or instructions) to the router 104 from a single parent node (e.g., a router 104 of another tile 102) when selected. Each child interface 110 may be configured to convey or couple signals (e.g., data and/or instructions) from the router 104 to a single child node (e.g., a router 104 of another tile 102) when selected. In one example, a router 104 may have as many parent interfaces and as many child interfaces as it has neighboring tiles 102. Within this context, a neighboring tile 102 is understood to refer to a tile 102 that is immediately adjacent to another tile 102 (e.g., without any other tiles 102 in between).

As will be described in further detail below, each router 104 may be configured to perform operations that allow the router 104 to select a parent interface 108 from among the plurality of parent interfaces connected to the router 104. For instance, the router $104_2$ of the tile $102_2$ may select the parent interface connected to the router $104_1$ of the tile $102_1$. This will cause the router $104_1$ of the tile $102_1$ to operate as the parent node of the router $104_2$ (i.e., to cause signals to flow from the router $104_1$ to the router $104_2$). The router 104 of any neighboring tile 102 may be selected as the parent node. For instance, in the example of FIG. 1A, the router $104_2$ of tile $102_2$ could alternatively select the parent interface connected to the router $104_3$ of the tile $102_3$ or the parent interface connected to the router $104_5$ of the tile $102_5$.

Similarly, each router 104 may be configured to perform operations that allow the router 104 to select a child interface 110 from among the plurality of child interfaces connected to the router 104. Continuing the example above, the router $104_2$ of the tile $102_2$ may select the child interface connected to the router $104_3$ of the tile $102_3$. This will cause the router $104_3$ of the tile $102_3$ to operate as the child node of the router $104_2$. The router 104 of any neighboring tile 102 may be selected as the child node (as long as the selected router is not already the parent node of the router making the selection). For instance, in the example of FIG. 1A, the router $104_2$ of the tile $102_2$ could alternatively select the child interface connected to the router $104_1$ of tile $102_1$ (as long as the router $104_1$ has not already been selected as the parent node as in the above example) or the child interface connected to the router $104_5$ of the tile $102_5$. Generally, a child node is selected after a parent node is selected, as selection of the parent node provides the node making the selections with the instructions needed to select the correct child node for the desired path. However, in other examples, the parent node and child node may be selected in parallel.

Enabling each router 104 to select any one of a plurality of other routers 104 as a parent node, and any one of a plurality of the other routers 104 as a child node allows a plurality of different serial networks or paths to be configured in the SoC 100. Thus, a serial network may be configured to follow any one of a plurality of potential paths through the tiles 102 of the SoC 100. Moreover, the serial network can be reset and reconfigured at any time to follow a different path of the plurality of paths.

Figure 1B:
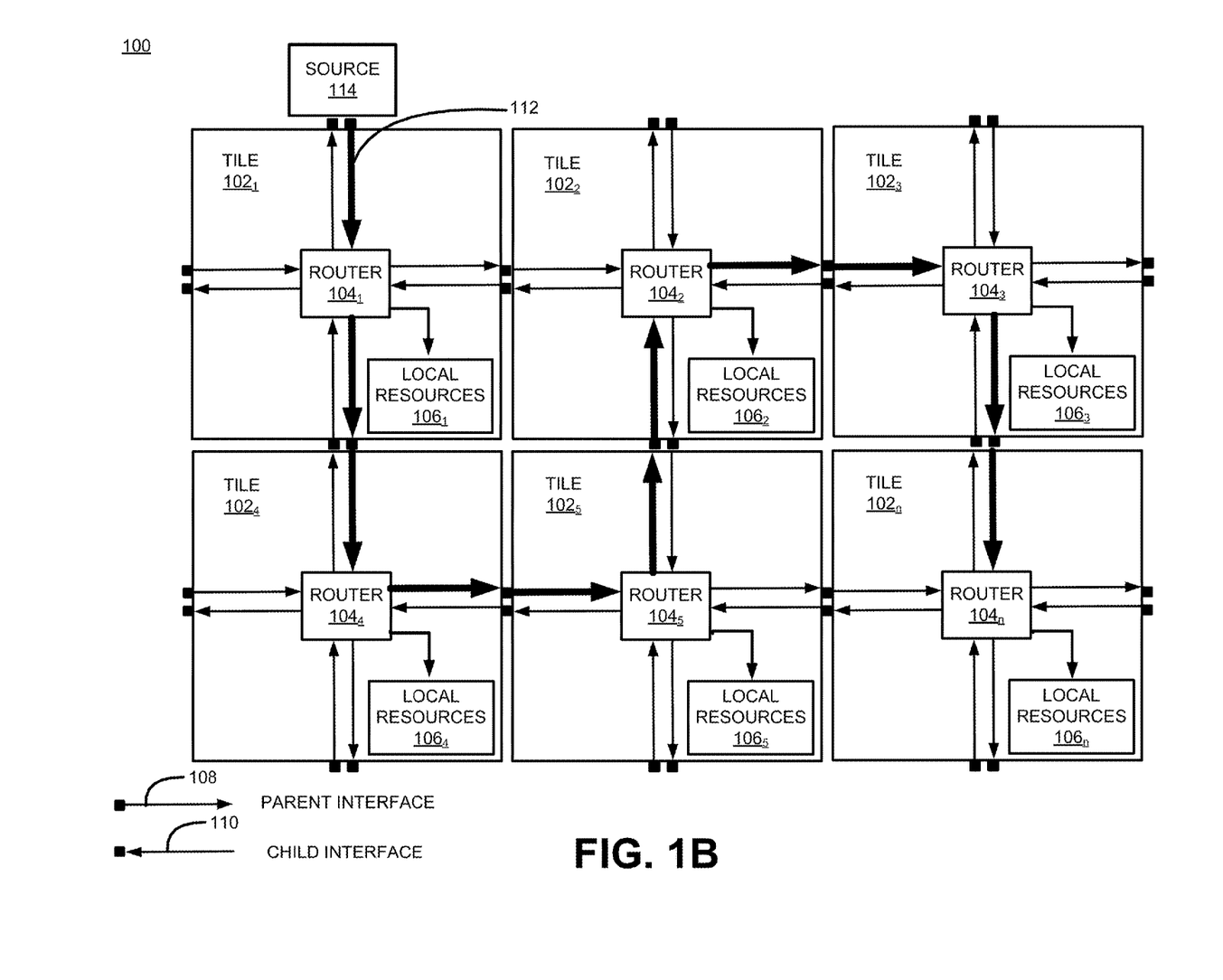
FIG. 1B illustrates a block diagram of an example serial network defined in the portion of the system-on-chip of FIG. 1A.

FIG. 1B, for instance, illustrates a block diagram of an example serial network 112 defined in the portion of the system-on-chip 100 of FIG. 1A. The serial network 112 is illustrated in bold lines (i.e., the bold lines and arrows in FIG. 1B indicate that the interfaces to which the arrows point have been selected as part of a serial network so that data can flow to and/or from the interfaces connected by the bold lines). As illustrated, the source 114 that drives the serial network 112 may include a top level interface, such as a TAP. The source 114 may be connected to the router $104_1$ of the first tile $102_1$, so that the router $104_1$ becomes the child node of the source 114. In turn, the router $104_1$ may be connected to the router $104_4$ of the tile $102_4$, so that the router $104_4$ becomes the child node of the router $104_1$. The serial network 112 may continue to the router $104_5$, the router $104_2$, the router $104_3$, and the router $104_n$, in that order, so that each subsequent router 104 becomes the child of the router 104 that precedes it in the serial network 112 (or, conversely, each router 104 becomes the parent of the router 104 that comes after it in the serial network 112). It should be noted that although the serial network 112 passes through every tile 102 of the SoC 100, different serial networks may be defined through the SoC 100 that omit or skip some tiles 102.

Figure 1C:
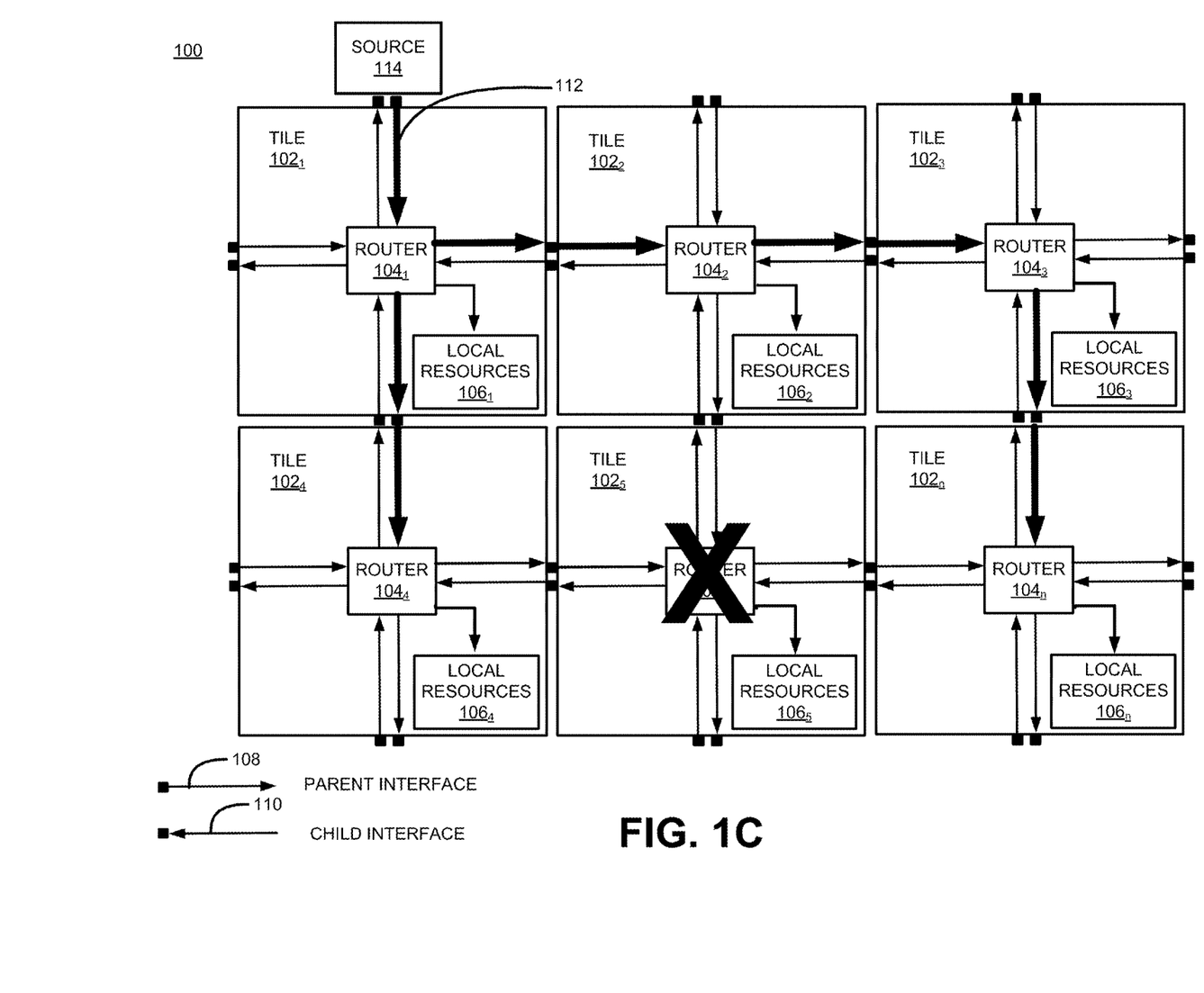
FIG. 1C illustrates an example of an alternate serial network that may be defined in the portion of the system-on-chip of FIG. 1A when a tile of the serial network of FIG. 1B experiences a failure.

The ability to configure a plurality of different serial networks or paths in the SoC 100 also allows for the bypass of any tiles 102 that experience failures. FIG. 1C, for instance, illustrates an example of an alternate serial network 114 that may be defined in the portion of the system-on-chip 100 of FIG. 1A when a tile 102 of the serial network 112 of FIG. 1B experiences a failure.

In particular, FIG. 1C illustrates an example in which the router $104_5$ of the tile $102_5$ has experienced a failure. In this case, the serial network 112 illustrated in FIG. 1B would fail when the serial network 112 reaches the tile $102_5$. Failure of the router $104_5$ may be detected when the router $104_5$ fails to convey or couple data to the next router $104_2$ in the serial network 112. However, the failed router $104_5$ can be bypassed by automatically reconfiguring the serial path 112 when the failure of the router $104_5$ is detected. In one example, the failed router $104_5$ can be bypassed via the alternate serial network 114 that connects the router $104_1$ of the tile $102_1$ directly to the router $104_2$ of the tile $102_2$, instead of to the router $104_4$ as shown in FIG. 1B. The alternate serial network 114 thus bypasses the tiles $104_4$ and $104_5$. It should be noted, however, that other configurations of serial networks that bypass the failed router $104_5$ are possible, and that the alternate serial network 114 presents just one possible configuration. As also illustrated by the connections from the tile $102_1$ to the tile $102_4$, all tiles 102 except for the tile $102_5$ housing the failed router $104_5$ can be reached.

In one example, the routers 104 are self-configurable. Examples of the present disclosure provide a process by which the routers 104 can self-configure to form a serial network, such as the serial network 112 illustrated in FIG. 1B. One example of a method for self-configuring a router as a node of a serial network in an SoC is described in further detail with respect to FIG. 2.

Figure 2:
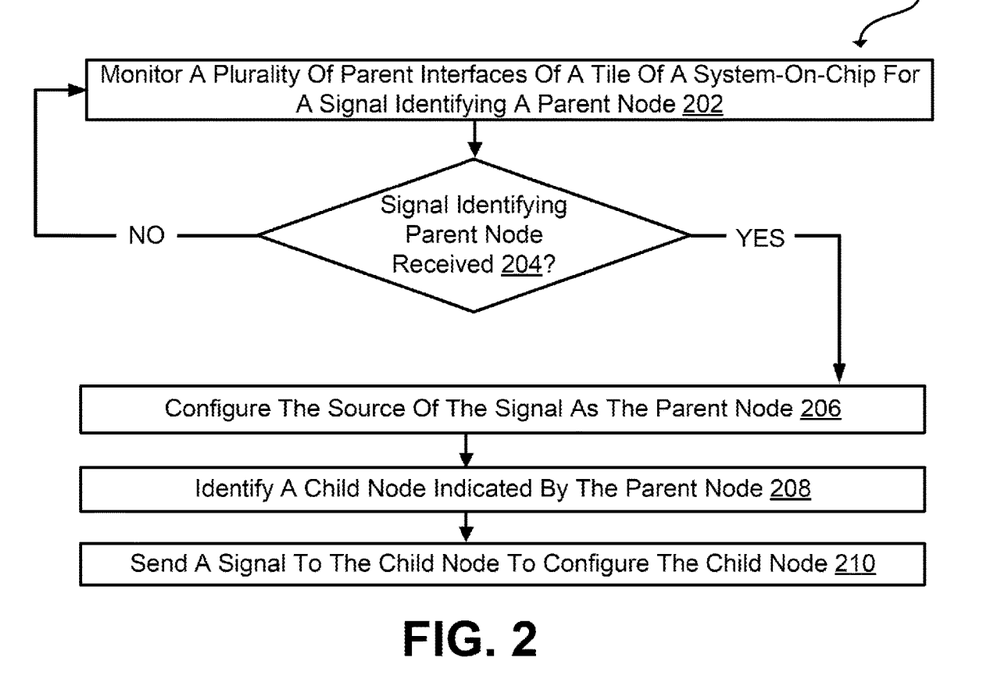
FIG. 2 illustrates an example method for configuring a serial network in a system-on-chip, according to the present disclosure.

FIG. 2 illustrates an example method 200 for configuring a serial network in a system-on-chip, according to the present disclosure. In one example, the method 200 may be performed by a router of a tile of the system on chip, such as any of the routers 104 illustrated in FIGS. 1A and 1B. In another example, the method 200 may be performed by a processing device of a computer system, such as the processing device 402 illustrated in FIG. 4. For the sake of example, the method 200 is described as being performed by a processing system.

At 202, the processing system may monitor a plurality of parent interfaces of a tile of a system-on-chip for a signal identifying a parent node. In one example, the processing system is part of a router of the tile, and the tile is one of a plurality of tiles of the SoC. Each tile of the SoC in this case may include a respective router (processing system) and a respective set of local resources, e.g., as discussed above in connection with FIGS. 1A and 1B.

In one example, the monitoring is performed in response to a reset signal being received by the processing system. For instance, the reset signal may indicate that an existing serial network in the SoC is to be reconfigured into or replaced with a new serial network. In another example, however, no prior existing serial network may be configured in the SoC, and the monitoring may be performed in order to configure a serial network in the SoC for the first time.

At 204, the processing system may determine whether the signal identifying the parent node has been received. In one example, the tile may include (e.g., as part of a router) a plurality of registers. For instance, the plurality of registers may include a first plurality of registers and a second plurality of registers, where each of the first plurality of registers and the second plurality of registers includes a plurality of bits. In one example, the first plurality of registers is used to select the parent node.

Figure 3:
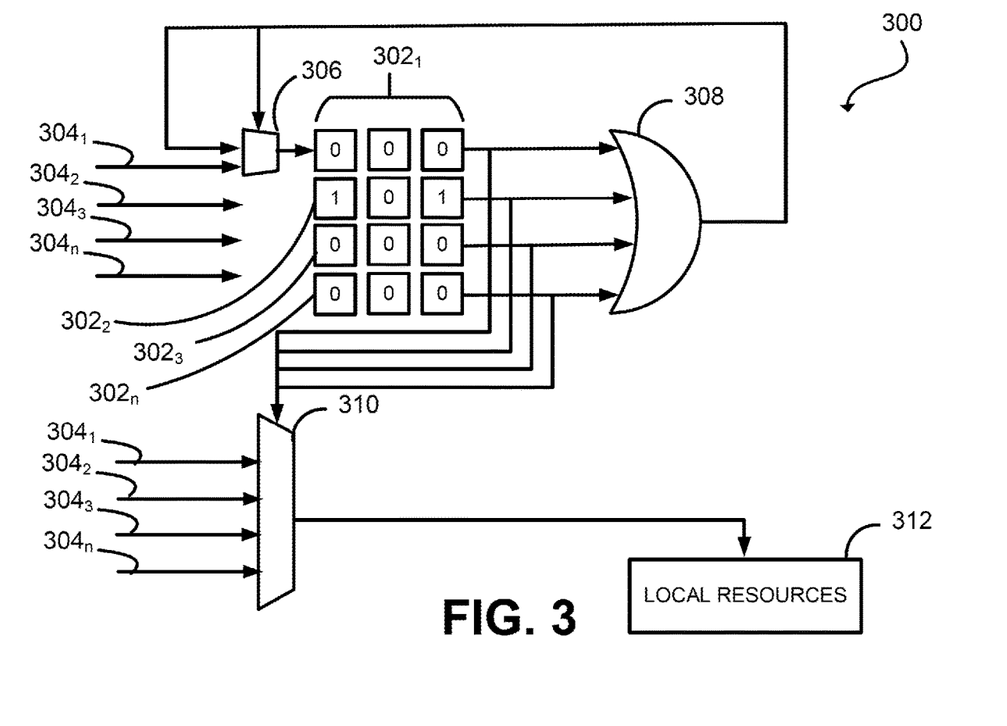
FIG. 3 illustrates one example of a router of a system-on-chip tile that includes a first plurality of registers for use in selecting a parent node.

FIG. 3, for instance, illustrates one example of a router 300 of a system-on-chip tile that includes a plurality of registers $302_1$-$302_n$ (e.g., a first plurality of registers, hereinafter individually referred to as a register 302 or collectively referred to as registers 302) for use in selecting a parent node. In the case of FIG. 3, the number of registers 302 in the first plurality of registers 302 may be equal to the number of parent interfaces in the plurality of parent interfaces. For instance, if the tile includes four parent interfaces, then the first plurality of registers 302 may include four registers. However, the number, n, of parent interfaces and registers 302 may be any number. Moreover, although each register 302 is illustrated in FIG. 3 as containing three bits, each register 302 may contain any number of bits.

In one example, each register 302 of the first plurality of registers 302 is coupled to one input of a plurality of inputs $304_1$-$304_n$ (hereinafter individually referred to as an input 304 or collectively referred to as inputs 304). Thus, there is a one-to-one correspondence between inputs 304 and registers 302. Each input 304 may be connected to a different interface of the plurality of parent interfaces. Thus, there is also a one-to-one correspondence between registers 302 and parent interfaces.

In one example, a first multiplexer 306 may be coupled between each input 304 and a register 302 corresponding to the input 304. In one example, the first multiplexer 306 may choose between a plurality of potential values to enter into each bit of each register 302 in response to a signal received on the input 304. In one example, the plurality of potential values may include logic zero and logic one. Thus, based on a signal received on a given input 304, the first multiplexer 306 may determine whether a value of logic zero or logic one should be entered for each bit position in the register 302 corresponding to the given input 304.

In one example, the processing system detects a signal identifying the parent node when one of the registers 302 contains a unique bit sequence (i.e., a bit sequence that differs from the bit sequences contained in all the other registers 302). For instance, in one example, all registers 302 may be initialized to contain zeros in all bit positions (e.g., for a bit sequence of [000] in FIG. 3), so that a source select multiplexer 310 chooses a default output that does not identify any nodes. The router 300 may also be sending zeros via its child interfaces in all directions, so that no other nodes are selected by the router 300. In this case, the processing system may detect a signal identifying the parent node when, after three cycles, a register 302 contains a bit sequence other than [000]. For instance, in FIG. 3, the register 302₂ contains a bit sequence of [101], while all the other registers 302 contain bit sequences of [000]. The unique bit sequence of [101] thus identifies the node connected to the parent interface connected to the input 304₂ as the parent node of the processing system.

In one example, an OR gate 308 may receive the output of each register 302. When the OR gate 308 detects a unique (or non-[000]) bit sequence in one of the registers 302, the second multiplexer may latch the node associated with the register 302 containing the unique bit sequence as the parent node of the processing system.

It should be noted that while FIG. 3 illustrates one example of a method by which the parent node may be identified, the parent node may also be identified in other ways. For instance, instead of detecting a unique or non-zero bit sequence in a register 302, the OR gate 308 may look for any desired bit sequence (e.g., a predefined bit sequence) that is known to the OR gate 308 as a signature of the parent node. Other examples may utilize an encoder that processes the signals received on all inputs 304 and provides a single bit sequence to a single register 302, may utilize an OR gate that processes the signals received on all inputs 304 and identifies a predefined bit sequence, or may utilize a finite-state machine that polls each input 304 for a signal containing a unique or predefined bit sequence.

Referring back to FIG. 2, if the processing system determines at 204 that the signal or signature identifying the parent node has not been received, then the method 200 may return to 202, and the processing system may continue to monitor for the signal identifying the parent node.

If, however, the processing system determines at 204 that the signal identifying the parent node has been received, then the method 200 proceeds to 206. At 206, the processing system may configure the source of the signal as the parent node.

In one example, configuring the source of the signal as the parent node involves configuring the processing system (or the node or tile of which the processing system is a part) so that the processing system accepts instructions and data from no other nodes except for the parent node.

Referring back to FIG. 3, in one example, the source of the signal may be configured as the parent node by coupling the outputs of the registers 302 to the source select multiplexer 310. The source select multiplexer 310 may, upon detecting a unique bit sequence from one of the registers 302, provide the node that is associated with the register 302 containing the unique bit sequence with access to the set of local resources 312 of the tile. This configures the node that is associated with the register 302 containing the unique bit sequence as the parent node of the processing system and causes the source select multiplexer 310 to stop any updating of the registers 302.

At 208 in one embodiment, the processing system may identify a child node indicated by the parent node. However, in one example, 208 may be omitted because the processing system may be part of a termination point of the serial network (e.g., part of a last node in the path the serial network takes through the SoC). In this case, the processing system will have no child nodes.

However, if the processing system is not part of a termination point of the serial network, then the signal identifying the parent node will also identify a child node. In one example, the signal identifying the parent node will also provide a signal (e.g., a bit sequence as described in connection with FIG. 3, which may be the same bit sequence (e.g., [101]) that identified the parent node in 204) that the processing system is to provide to the child node to identify the processing system as the parent node of the child node. For instance, the signal received from the parent node may identify an entire path of the serial network, including the nodes that make up the serial network and the order in which signals are passed from node to node. Thus, the processing system may identify the child node by detecting an indication of the child node in the signal received from the parent node. The child node be configured in a manner similar to the router 300 illustrated in FIG. 3; thus, the router of the child node will perform the similar operations to those described above in order to monitor registers of the router of the child node for the bit sequence identifying the router 300 as the child node's parent node.

It should be noted that in some examples, the processing system may have more than one child node. In this case, 208 may be repeated for each child node.

At 210 in one embodiment, the processing system may send a signal to the child node to configure the child node. In one example, the signal that the processing system sends to the child node may be similar to the signal that the processing system received from the parent node. For instance, the processing system may send a signal to the child node that includes a unique or predefined bit sequence that identifies the processing system as the parent of the child node. As with 208, 210 may be repeated for each child node of the processing system that has more than one child node.

The method 200 may be performed by each node of a serial network on an SoC. Thus, the nodes of the SoC may self-configure themselves into the serial network. Moreover, as discussed above, the nodes may be reprogrammed at any time (even at runtime) to repeat the self-configuration process to define a new (different) serial network on the SoC.

Figure 4:
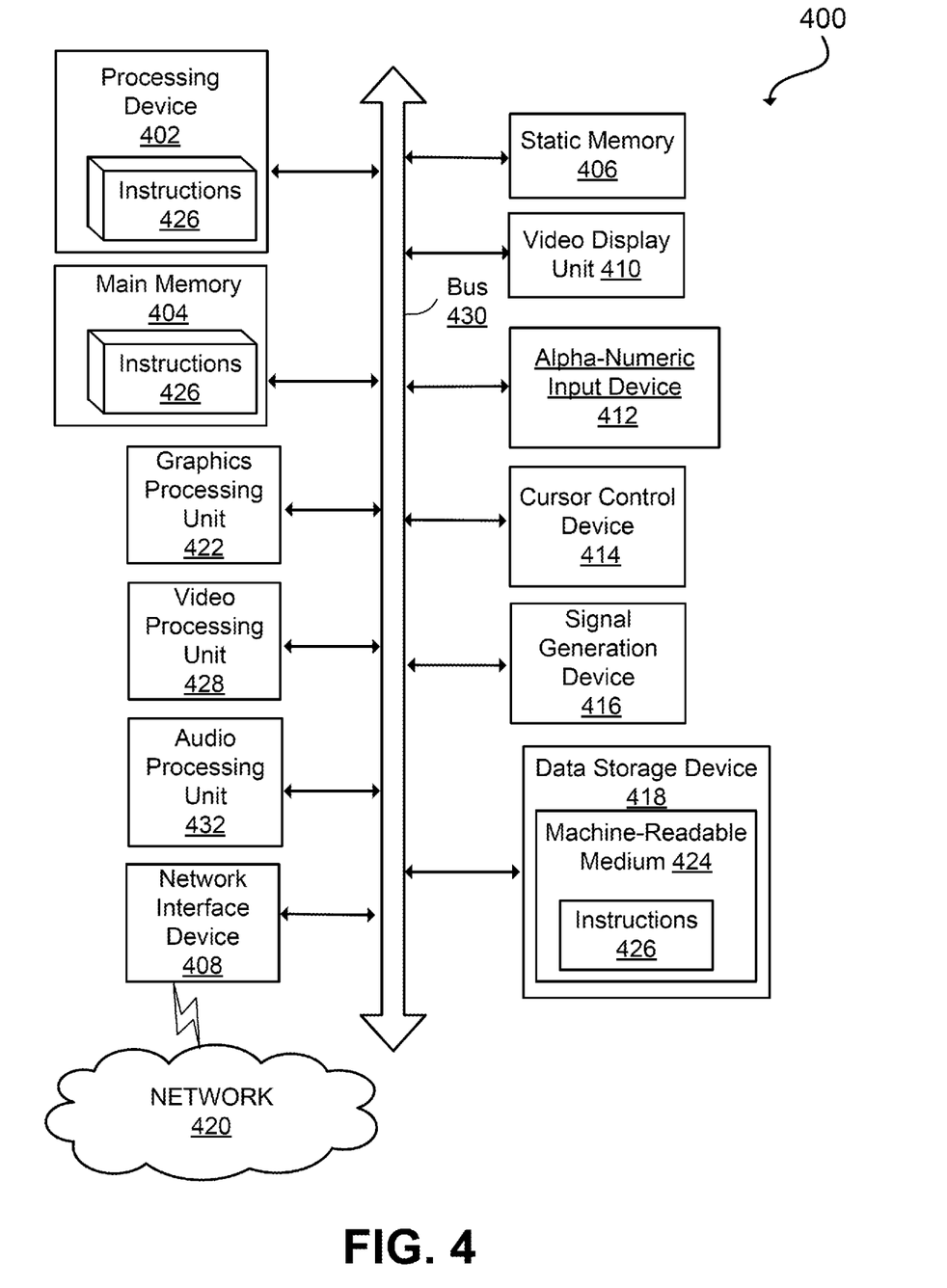
FIG. 4 depicts a diagram of an example computer system in which embodiments of the present disclosure may operate.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A tile of a system on chip, the tile comprising
a router;
a set of local resources coupled to the router;
a plurality of parent interfaces, wherein each parent interface of the plurality of parent interfaces is configured to couple the router to a respective neighbor router residing outside of the tile when selected; and
a plurality of child interfaces, wherein each child interface of the plurality of child interfaces is configured to couple the router to another respective neighbor router residing outside of the tile when selected,
wherein the router is to select one parent interface of the plurality of parent interfaces, such that a selection of the one parent interface causes the respective neighbor router coupled to the one parent interface to operate as a parent of the router, and
wherein the router is to further select one child interface of the plurality of child interfaces, such that a selection of the one child interface causes the router to operate as a parent of the respective neighbor router coupled to the one child interface.

2. The tile of claim 1, wherein the system-on-chip comprises a plurality of tiles configured in a same manner as the tile.

3. The tile of claim 1, wherein the selection of the one parent interface allows the respective neighbor router coupled to the one parent interface to access the set of local resources.

4. The tile of claim 1, wherein the selection of the one child interface allows the router to access a set of local resources coupled to the respective neighbor router coupled to the one child interface.

5. The tile of claim 1, wherein each parent interface of the plurality of parent interfaces and each child interface of the plurality of child interfaces comprises a serial interface.

6. The tile of claim 1, wherein the respective neighbor router coupled to the one parent interface, the router, and the respective neighbor router coupled to the one child interface form a portion of a serial network.

7. The tile of claim 1, wherein the router comprises at least one of: a control register or an enabler.

8. The tile of claim 7, wherein the router comprises a plurality of registers, and each register of the plurality of registers is associated with a respective parent interface of the plurality of parent interfaces.

9. The tile of claim 8, wherein each register of the plurality of registers includes a plurality of bits.

10. The tile of claim 9, wherein respective outputs of the plurality of registers are coupled to a multiplexer, and wherein the multiplexer is to select the one parent interface of the plurality of parent interfaces when a register of the plurality of registers that is associated with the one parent interface contains a bit sequence that is different from bit sequences contained in all other registers of the plurality of registers.

11. A system-on-chip comprising:
a source to drive a network on the system-on-chip; and
a plurality of tiles, wherein each tile of the plurality of tiles comprises:
a router;
a set of local resources coupled to the router;
a plurality of parent interfaces, wherein at least some parent interfaces of the plurality of parent interfaces connect the router to a respective neighbor router residing on a neighboring tile of the system-on-chip; and
a plurality of child interfaces, wherein at least some child interfaces of the plurality of child interfaces connect the router to a respective neighbor router residing on a neighboring tile of the system-on-chip,
wherein the router is to select one parent interface of the at least some parent interfaces, such that a selection of the one parent interface causes the respective neighbor router coupled to the one parent interface to operate as a parent of the router,
wherein the router is to further select one child interface of the at least some child interfaces, such that a selection of the one child interface causes the router to operate as a parent of the respective neighbor router coupled to the one child interface, and
wherein the source is coupled to the router of a first tile of the plurality of tiles via a first parent interface of the plurality of parent interfaces of the first tile.

12. The system-on-chip of claim 11, wherein the network comprises a serial network that connects respective routers of a subset of the plurality of tiles in a serial manner.

13. The system-on-chip of claim 11, wherein the source comprises a top level interface.

14. The system of claim 11, wherein the network comprises a serial network that is reconfigurable.

15. A method comprising:
monitoring a plurality of parent interfaces of a tile of a system-on-chip for a signal identifying a parent node, wherein the monitoring comprises monitoring a plurality of registers of the tile, and wherein each register of the plurality of registers is associated with one parent interface of the plurality of parent interfaces, for a bit sequence that is unique among bit sequences contained in all registers of the plurality of registers; and
configuring, in response to determining that the signal identifying the parent node has been received, a source of the signal as the parent node, so that the tile accepts instructions and data from no other nodes except for the parent node.

16. The method of claim 15, further comprising:
identifying a child node indicated by the parent node; and
sending, in response to the identifying, a signal to the child node to configure the child node.

17. The method of claim 15, wherein the method is performed by a router residing on the tile, and the parent node comprises one of: a source of a serial network or a router residing on another tile of the system-on-chip that is a neighbor of the tile.

18. The method of claim 15, wherein the monitoring is performed after a silicon implementation of the system-on-chip and in response to a receipt of a reset signal.

19. The method of claim 15, wherein the configuring comprises providing the source of the signal with access to a set of resources coupled to a processing device.

* * * * *